United States Patent
Kumar et al.

(10) Patent No.: US 10,489,682 B1
(45) Date of Patent: Nov. 26, 2019

(54) OPTICAL CHARACTER RECOGNITION EMPLOYING DEEP LEARNING WITH MACHINE GENERATED TRAINING DATA

(71) Applicant: Automation Anywhere Inc., San Jose, CA (US)

(72) Inventors: Nishit Kumar, San Jose, CA (US); Thomas Corcoran, San Jose, CA (US); Bruno Selva, Mountain View, CA (US); Derek S Chan, San Jose, CA (US); Abhijit Kakhandiki, San Jose, CA (US)

(73) Assignee: Automation Anywhere, Inc., San Jose, CA (US)

( * ) Notice: Subject to any disclaimer, the term of this patent is extended or adjusted under 35 U.S.C. 154(b) by 190 days.

(21) Appl. No.: 15/851,617

(22) Filed: Dec. 21, 2017

(51) Int. Cl.
| | | |
|---|---|---|
| *G06K 9/62* | (2006.01) | |
| *G06N 3/08* | (2006.01) | |
| *G06N 3/04* | (2006.01) | |
| *G06K 9/00* | (2006.01) | |
| *G06K 9/18* | (2006.01) | |

(52) U.S. Cl.
CPC ....... *G06K 9/6256* (2013.01); *G06K 9/00463* (2013.01); *G06K 9/00469* (2013.01); *G06K 9/18* (2013.01); *G06K 9/6254* (2013.01); *G06K 9/6298* (2013.01); *G06N 3/04* (2013.01); *G06N 3/08* (2013.01)

(58) Field of Classification Search
CPC .. G06K 9/6298; G06K 9/6254; G06K 9/6256; G06K 9/00463; G06K 9/00469; G06K 9/00456; G06K 9/18; G06N 3/04; G06N 3/08

USPC .......................................................... 382/160
See application file for complete search history.

(56) References Cited

U.S. PATENT DOCUMENTS

| | | | | |
|---|---|---|---|---|
| 6,009,192 | A | * | 12/1999 | Klassen ................... H04N 1/64 382/166 |
| 8,504,803 | B2 | | 8/2013 | Shukla |
| 9,462,042 | B2 | | 10/2016 | Shukla et al. |
| 10,025,773 | B2 | * | 7/2018 | Bordawekar ......... G06F 17/276 |
| 2005/0002566 | A1 | * | 1/2005 | Di Federico ....... G06K 9/00456 382/176 |

(Continued)

OTHER PUBLICATIONS

Chollet, Francois et al., Keras: The Python Deep Learning Library, GitHub, https://github/keras-team/keras, 2015.

*Primary Examiner* — Ali Bayat
(74) *Attorney, Agent, or Firm* — Prasad IP, PC (57) ABSTRACT

An optical character recognition system employs a deep learning system that is trained to process a plurality of images within a particular domain to identify images representing text within each image and to convert the images representing text to textually encoded data. The deep learning system is trained with training data generated from a corpus of real-life text segments that are generated by a plurality of OCR modules. Each of the OCR modules produces a real-life image/text tuple, and at least some of the OCR modules produce a confidence value corresponding to each real-life image/text tuple. Each OCR module is characterized by a conversion accuracy substantially below a desired accuracy for an identified domain. Synthetically generated text segments are produced by programmatically converting text strings to a corresponding image where each text string and corresponding image form a synthetic image/text tuple.

36 Claims, 8 Drawing Sheets

(56) References Cited

U.S. PATENT DOCUMENTS

| | | | |
|---|---|---|---|
| 2005/0144462 A1* | 6/2005 | Lagarde | G06F 21/46 713/184 |
| 2010/0013848 A1* | 1/2010 | Hekstra | G09G 3/20 345/589 |
| 2012/0076415 A1* | 3/2012 | Kahn | G06F 17/27 382/182 |
| 2016/0019049 A1 | 1/2016 | Kakhandiki et al. | |
| 2016/0078368 A1 | 3/2016 | Kakhandiki et al. | |
| 2016/0119285 A1 | 4/2016 | Kakhandiki et al. | |
| 2017/0060108 A1 | 3/2017 | Kakhandiki et al. | |
| 2017/0154230 A1* | 6/2017 | Dow | G06K 9/00879 |
| 2018/0004823 A1 | 1/2018 | Kakhandiki et al. | |
| 2018/0157386 A1* | 6/2018 | Su | G06F 9/451 |

\* cited by examiner

FIG. 1

INVOICE

7836248

Automation Anywhere, Inc.
533 River Oaks Pkwy
San Jose, CA 95134

Bill To:
Your Company, Inc.
123 Fake St.
San Jose, CA 95134

Date: Dec 4, 2017
Payment Terms: NET 30
Due Date: Jan 1, 2018
Balance Due: $66.49

| Item | Quantity | Rate | Amount |
|---|---|---|---|
| Widget | 3 | $1 | $3 |
| Gadget | 4 | $2 | $8 |
| Stuff | 100 | $0.50 | $50 |

Subtotal: $61
Tax (9%): $5.49
Total: $66.49

OPTICAL CHARACTER RECOGNITION EMPLOYING DEEP LEARNING WITH MACHINE GENERATED TRAINING DATA

FIELD OF THE DISCLOSURE

This disclosure relates generally to the field of data processing systems and more particularly to computerized, optical character recognition.

BACKGROUND

Optical Character Recognition (OCR) within computer systems involves conversion of data encoded in image form into machine-encoded text. A common example is conversion from a known image format, such as PDF, TIFF or JPEG, among others, into a text encoded format. OCR operates to provide a form of information entry to allow printed paper data records to be converted to a format that can be electronically edited, searched, stored more compactly, displayed on-line, and used in various machine processes.

Accuracy of OCR has become more important as computerization of business processes has increased. Unfortunately, known OCR programs do not provide the accuracy required for automated and systematic usage in business processes. There is accordingly a need for an improved OCR system that provides a level of accuracy required for demanding applications such as business processes.

SUMMARY

Optical character recognition systems capable of providing the level of accuracy required for business processes, such as with human accuracy or better are disclosed herein. The disclosed systems employ a novel methodology that exploits a collection of weak & low-accuracy OCR systems. This is employed to build a strong & high-accuracy deep-learning system for the OCR problem. The disclosed systems reduce the need for expensive ground-truth creation via human labeling, which is almost always needed for deep-learning models. Certain embodiments employ a number of accuracy improvement techniques that can be adapted to deep learning solutions for other problems.

Deep neural nets are typically hungry for large amounts of labeled data, for example, the tuples (image, text) for OCR. Generating this type of data can be quite time consuming and expensive when considering that a data set to adequately train a deep neural net can comprise millions or tens of millions of tuples. Advantageously, the disclosed systems employ a novel combination of conventional, relatively low accuracy OCR systems to generate training data rapidly and without requiring time consuming and expensive human labeling. The disclosed systems employ a combination of synthetic text segments and real-life text segments. The former are image segments generated programmatically by rendering an "image" for a chosen "text" string using the recipe described. Real-life text segments are extracted out of documents, and they most accurately represent the statistics of the domain for which the OCR system is built for, for example, English language invoices. The "image" is extracted out of real documents, but the corresponding "text" is generated using weak and low-accuracy OCR systems with potential errors.

Additional aspects related to the invention will be set forth in part in the description which follows, and in part will be apparent to those skilled in the art from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques disclosed herein. Specifically.

DETAILED DESCRIPTION

In the following detailed description, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

Survey and testing of a number of commercially available, state-of-the-art OCR systems, both commercial and open-source ones, has revealed a level of accuracy that falls short of human-level accuracy—which is presumed to be at 98% or higher character-level accuracy, as surmised for a domain of documents, such as for example, invoices. Most mature and commercial OCR products are built using traditional algorithms, which do not perform well if the document image contains fancy fonts, patterned noise (for example, in table headers of invoices), or image distortions due to the scanning process. On the other hand, open-source OCRs built using modern deep-learning methods fall short on accuracy since they are trained on more disparate, wider, and different statistics of text images as compared to a particular domain of interest.

The systems and methods disclosed herein employ a trained deep-neural net that rivals human accuracy for OCR of documents within a domain of interest. Table 1 below shows accuracy results on a test set comprising black-and-white segments from English language invoices. Segment-level accuracy represents accuracy of a whole word (1.0 if correct, otherwise 0).

TABLE 1

OCR accuracy comparison on black-and-white English language invoices

|  | Segment-Level Accuracy | Character-Level Accuracy |
|---|---|---|
| Embodiment 1 (no Human Labeling) | 0.82 | 0.95 |
| OCR1 (neural model) | 0.66 | 0.84 |
| OCR2 (traditional) | 0.63 | 0.81 |
| OCR3 (traditional) | 0.56 | 0.72 |
| OCR4 (traditional) | 0.45 | 0.65 |

Human accuracy is generally around 98%, with mistakes arising largely from boredom or if text is unreadable. Accuracy may also be affected by transcription errors, for example the text may be correctly recognized but entered incorrectly. As seen in Table 1, four commercially available OCR programs (OCR1, OCR2, OCR3, OCR4) produce character-level accuracy ranging from 0.65 to 0.84 (65%-84%). An embodiment employing the principles described herein produced character-level accuracy of 95%, without the benefit of mistakes in training data fixed via human labeling, which is close to human-level accuracy.

Deep neural nets require large data sets for adequate training. In the case of OCR, the data takes the form of tuples, image/text pairs. Conventionally, such data can be generated by humans who perform manual labeling. To increase accuracy, the same data may be labeled by multiple individuals and then compared to identify mistakes. While this technique can yield a high-quality data set for training, it can be quite time consuming and expensive when considering that a data set to adequately train a deep neural net can comprise millions or tens of millions of tuples. Advantageously, the disclosed systems employ a novel combination of conventional, relatively low-accuracy OCR systems to generate training data rapidly and without requiring time-consuming and expensive human labeling.

Figure 1:
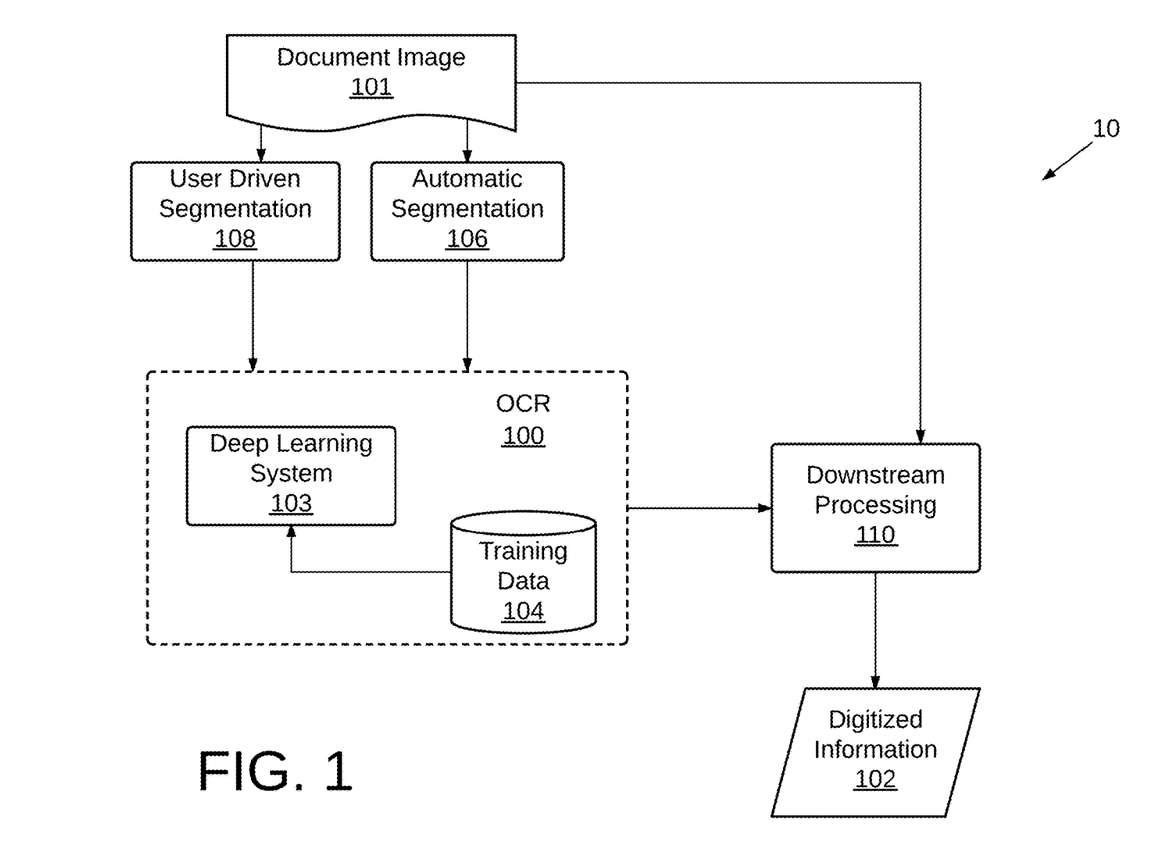
FIG. 1 is high-level block diagram of an embodiment of a document digitization system employing a deep-learning based OCR system.

FIG. 1 is high-level block diagram of an embodiment of a computerized document digitization system employing a deep-learning based OCR system that operates in accordance with the principles described herein. The computer system 10 operates to convert a document image 101 into digitized, textually encoded information 102. The document image 101 may be a conventionally encoded image file such as a PDF, TIFF, or JPEG file. The computer system 10 employs an OCR system 100 including deep learning system 103 which employs a conventional class of machine learning algorithms to perform OCR. As will be appreciated by those skilled in the art, such algorithms are characterized by a cascade of multiple layers of nonlinear processing units for feature extraction and transformation. Each successive layer uses the output from the previous layer as input. Such algorithms may learn in supervised and/or unsupervised manners, and may learn multiple levels of representations that correspond to different levels of abstraction. Moreover, a form of gradient descent for training via backpropagation may be employed. Deep learning system 103 operates with training data 104, stored in conventional data storage, that is generated to train deep learning system 103 designed to perform at high accuracy for a particular domain. For example, if the domain of interest is English language invoices, then the training data 104 will comprise image/text pairs generated from a large number (e.g. a few hundreds of thousands) of invoices.

The system 10 employs automatic segmentation module 106 that operates conventionally to break up a document image into sub-images of characters, words, or even group of contiguous words in a line. In contrast to conventional OCRs, that decode one character at a time, the OCRs based on a neural network (such as the one described herein) can decode groups of words in one shot. Isolating a sub-image of one character from a black-and-white document image is usually performed by identifying streaks of black pixels. These character segmentations are then combined horizontally allowing for inter-letter white space to form word segmentation, and further combined horizontally allowing for inter-word white space. These sub-images of groups of words are processed one by one by the OCR system 100 to produce the digitized text. The system 10 may also permit user driven segmentation 108.

The decoded text generated by OCR system 100 is preferably further processed at downstream processing module 110 to extract semantically related text elements. For example, decoded text across multiple lines could be grouped together to form "Shipping Address" on an invoice. The downstream processing 110 may additionally require the original document image 101 to make this determination. The downstream processing 110 may also include techniques to increase accuracy by imposing constraints provided by a lexicon, a list of words that are allowed to occur in a document. This might be, for example, all the words in the English language, or a more technical lexicon for a specific field, such as invoices. In certain embodiments, other techniques such as "near-neighbor analysis" which makes use of co-occurrence frequencies to correct errors may also be employed. The digitized information 102 may be a plain text stream or a file of characters or a spreadsheet organizing the information of interest and arranged according to semantics. In certain embodiments, the original layout of the document image 101 may be preserved and annotated with a searchable textual representation.

Figure 2:
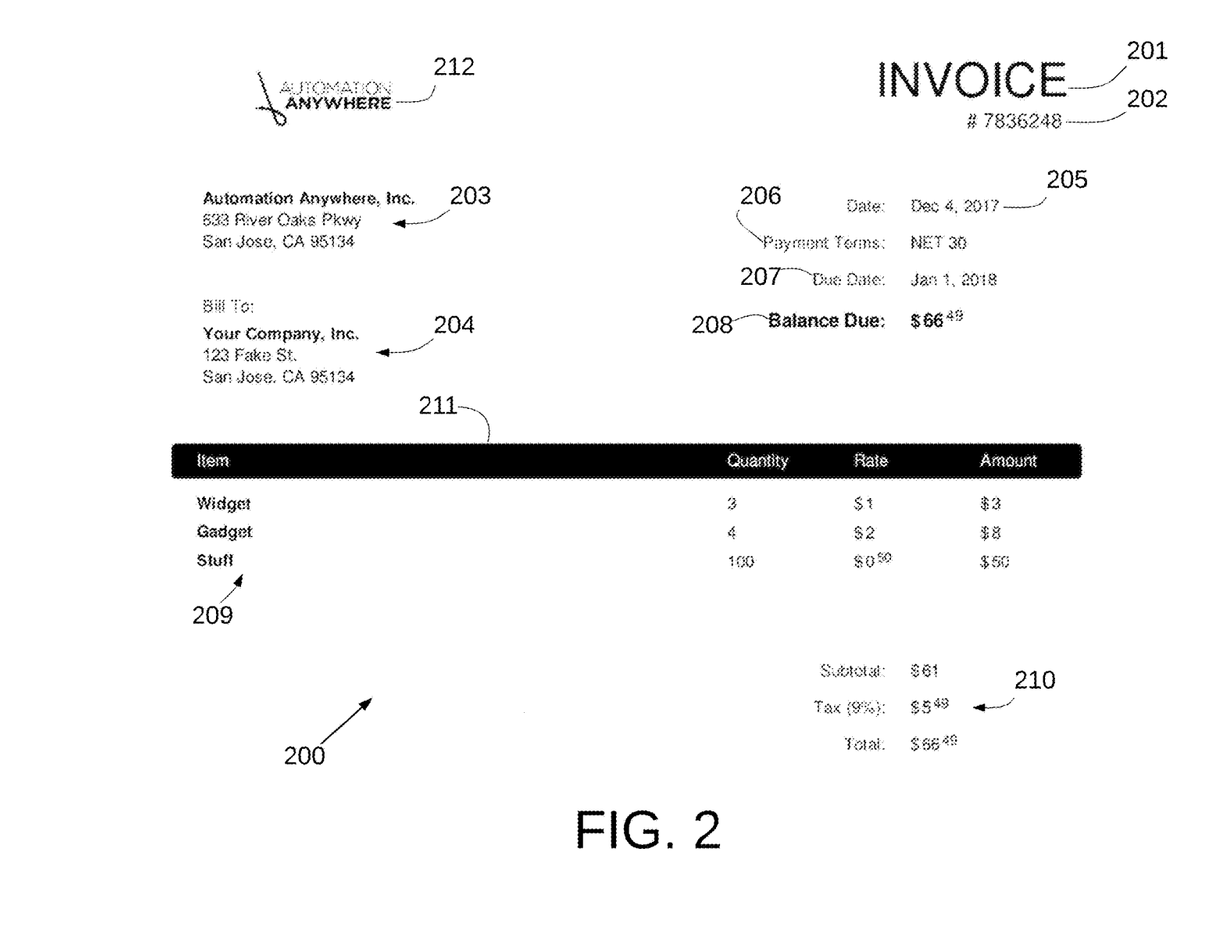
FIG. 2 shows an image of an invoice that may be processed by the deep-learning based OCR system.

FIG. 2 shows an image of an invoice that may be processed by the deep-learning based OCR system 100. As seen, the invoice 200 has a number of labels and associated data fields that are necessary for an invoice. The invoice is labeled as an "invoice" at 201. There is an invoice number 202 that uniquely identifies the invoice. The invoicing entity and address, seen at 203, identify the entity issuing the invoice. The recipient of the invoice is shown at 204. In addition, the invoice has a date field 205, payment terms 206, a due date 207 and a balance due 208. An itemized listing of the items supplied by the invoicing entity is shown at 209, with associated amounts for quantity, rate (price per item), and total amount for the item. Subtotal amount, tax and total are shown at 210. The invoice 200 can also be seen to be formatted with text of different sizes and with varying font characteristics such as the use of bold font in certain places such as for "Balance Due" at 208 for the label "Balance Due" and the associated amount "$66.49". As seen the amount 66.49 is in a form in which the cents are represented in a smaller font, in superscript format. As will be appreciated by those skilled in the art, alternative representations may also be found in other invoices. Different sizes of fonts are also used, such as for Invoice field 201 which is in a larger font than other fields. A company logo is also seen at 212. Also, a table header bar is seen at 211 with text in reverse color (white on black) contained therein.

OCR processing of invoice 200 poses challenges over and above those posed by text formatted in paragraph form. The location of the fields explained above for invoice 200 can vary dramatically. The content of the fields may also vary. For example, some invoices may not contain an itemization as shown at 209. Some invoices may also only provide payment terms such as 206 and will not provide a due date 207. Other invoices may include fields not shown in invoice 200, such as pending amounts that are unpaid. Moreover, aesthetic elements can vary widely. The fonts can vary, with different colors, sizes and font types being used. Ornamental images may also be used in the background or foreground of the invoice. A background image may take the form of a watermark. A foreground image may take the form of a corporate logo such as seen at 212.

Figure 3:
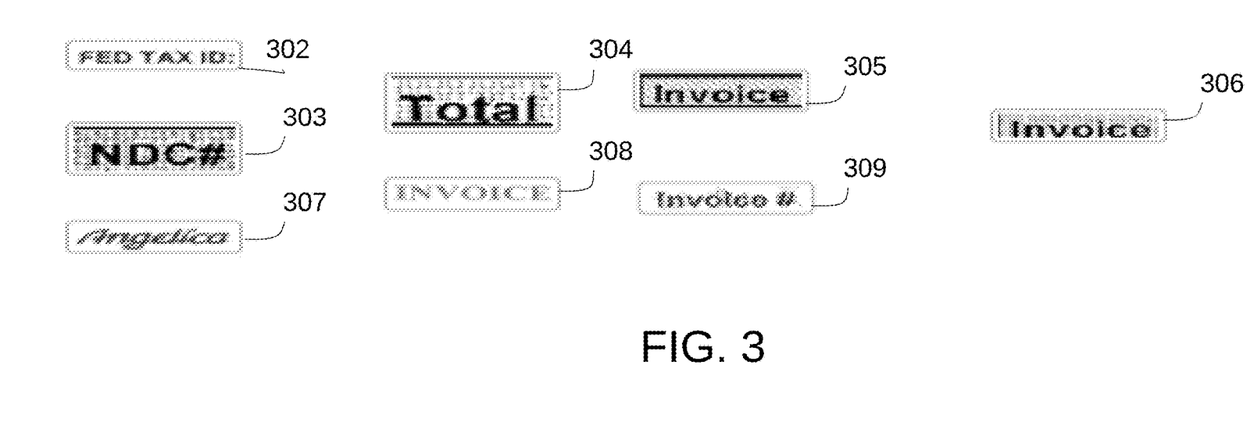
FIG. 3 shows examples of text segments that challenge conventional, low accuracy OCR systems.

Some elements of invoices can pose particular challenges to OCR conversion. Examples of these are shown in FIG. 3. The input to an OCR system is a black-and-white image in digital format. Independent of file format the digital representation of an image is a grid of pixels, each of which has a number of bits to designate the color at that grid position. For black-and-white images the color could either be black (e.g., (0,0,0) in 24-bit RGB format) or white (e.g., (255,255, 255) in 24-bit RGB format). The challenge in OCR is to decode the text character(s) corresponding to a grid of pixel values. For example, although the desired decoded text for both 305 and 306 is the word "Invoice" the grid of pixel values corresponding to the two cases are vastly different. Such diversity in input may be caused due to reasons such as varied fonts and sizes (e.g., 302 and 307 have very different fonts), presence of patterned noise (e.g., 303, 304, 305, 306), presence of spurious lines due to segmentation artifacts (e.g., 303, 304, 305), scanning artifacts such as excessive fading (e.g., 308 is a faded image), blurring as seen at 309, or excessive blackening. These variations can typically cause challenges to OCR conversion, for example, in testing, the OCR system OCR1 produces incorrect results for the 8 examples shown in FIG. 3.

It should be noted that while the present disclosure shows invoices as an example of a particular domain in which the principles of the invention may be employed, the principles described herein may be employed equally well in other domains, and in particular in other types of business documents, e.g., passports, property deeds, utility bills, eviction notices, and bank account statements.

Figure 4A:
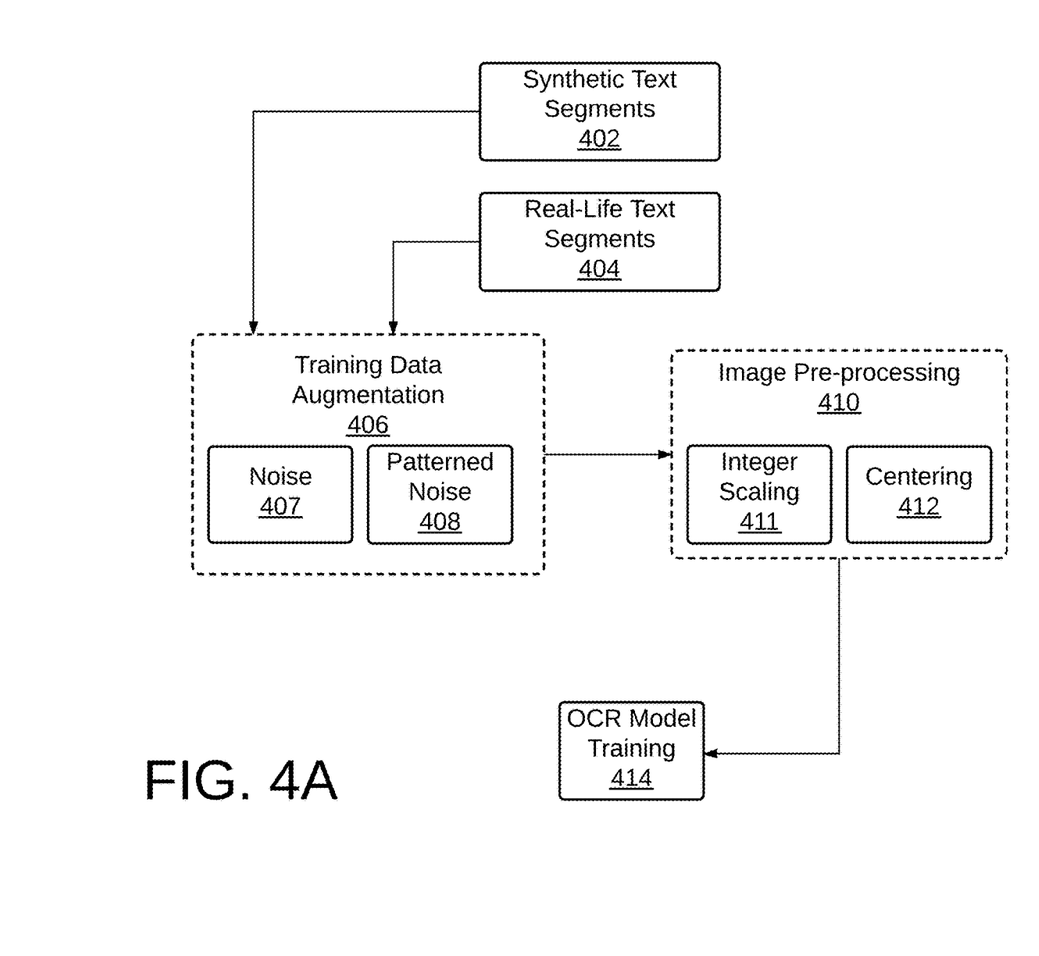
FIG. 4A is a block diagram illustrating generation of real-life text segments and synthetic text segments in generating the training data 104 of FIG. 1.

FIG. 4A is a block diagram illustrating generation of the real-life text segments and synthetic text segments in training the deep learning system shown in FIG. 1. A deep neural net such as employed by deep learning system 103 requires a large volume of training data 104 to operate effectively. In the OCR realm, such data takes the form of tuples (image, text). The disclosed systems employ a combination of synthetic text segments and real-life text segments as part of training data 104. Synthetic text segments 402 are image segments generated programmatically by rendering an "image" for a chosen "text" string as described in further detail in connection with FIG. 4C. Real-life text segments 404 are sub-images extracted out of documents, and they most accurately represent the statistics of the domain for which the OCR system is built, for example, English language Invoices. The "image" is extracted out of real documents, but the corresponding "text" is generated using weak and low-accuracy OCR systems with potential errors, as described in further detail in connection with FIG. 4B.

The synthetic text segments 402 and real-life text segments 404 are processed by training data augmentation module 406 and followed by image pre-processing module 410 to be used for OCR model training at 414. Image noise is superimposed at 407 onto randomly selected text images in the synthetic and real-life text segments 402 and 404. Preferably different types of image noise may be superimposed: (a) random speckled noise, (b) random lines, (c) random binarization threshold, (d) white on black text. Adding image noise is only performed during training and not post-training (inference).

In processing invoices, it was observed that table headers in invoices were the hardest for the OCR to extract text from. The table headers contained a wide variety of patterned-noise schemes, created by the aesthetic designers of the invoices. Fifty to sixty of the most common patterns were chosen and software code was developed to programmatically generate the chosen most common patterns. Preferably, at 408, for randomly selected text images in training data, different types of patterned noise are superimposed. Adding patterned noise is only performed during training and not post-training (inference).

In image pre-processing 410, the image portion of the text segments 402 and 404 are scaled and centered 412. Conventional deep learning algorithms have a fixed input dimension, for example, a 512×64 field-of-view. On the other hand, segment images in the text segments 402, 404 can have a wide range of dimensions. Rather than requiring the deep learning system 103 to learn a wide range of sizes (i.e., train the neural net for "size invariance"), embodiments scale the input images to the largest size that fits in the field of view of the selected deep learning algorithm. For example, if a segment is 76×21 it is upscaled at 411 by a factor of 3 (using a conventional pixel replication algorithm in one embodiment) to produce a larger segment of size 228×63. Furthermore, rather than pasting the 228×63 segment arbitrarily anywhere within the 512×64 field-of-view (i.e., train the neural net for "translation invariance") it is centered at 412, by for example, pasting the 228×63 segment at the center of 512×64 palette, pre-initialized with white pixels. The pre-processing performed by modules 406 and 410, operate to restrict an arbitrary segment to format into a fixed normative input for the deep learning system 103, thereby avoiding the need for the system 103 to learn "size invariance" or "translation invariance". This is in contrary to current approaches in training deep nets for computer vision problems, and helps in improving accuracy of the model employed by system 100.

Deep learning system 103 preferably comprises several convolution layers with recurrent layers stacked on top. The convolution layers extract low-level features from the input image, whereas recurrent layers extract rules of how to stitch a sequence of image features to derive a sequence of text characters. Recurrent layers are most effectively trained in phases (called curriculums) with progressively increasing difficulty-level of training data used in each phase. This is called curriculum learning, and the curricula are preferably based on ramping length of text and noise levels. In certain embodiments, the Keras framework, available at https://github.com/mbhenry (Author: Mike Henry) may be used.

Figure 4B:
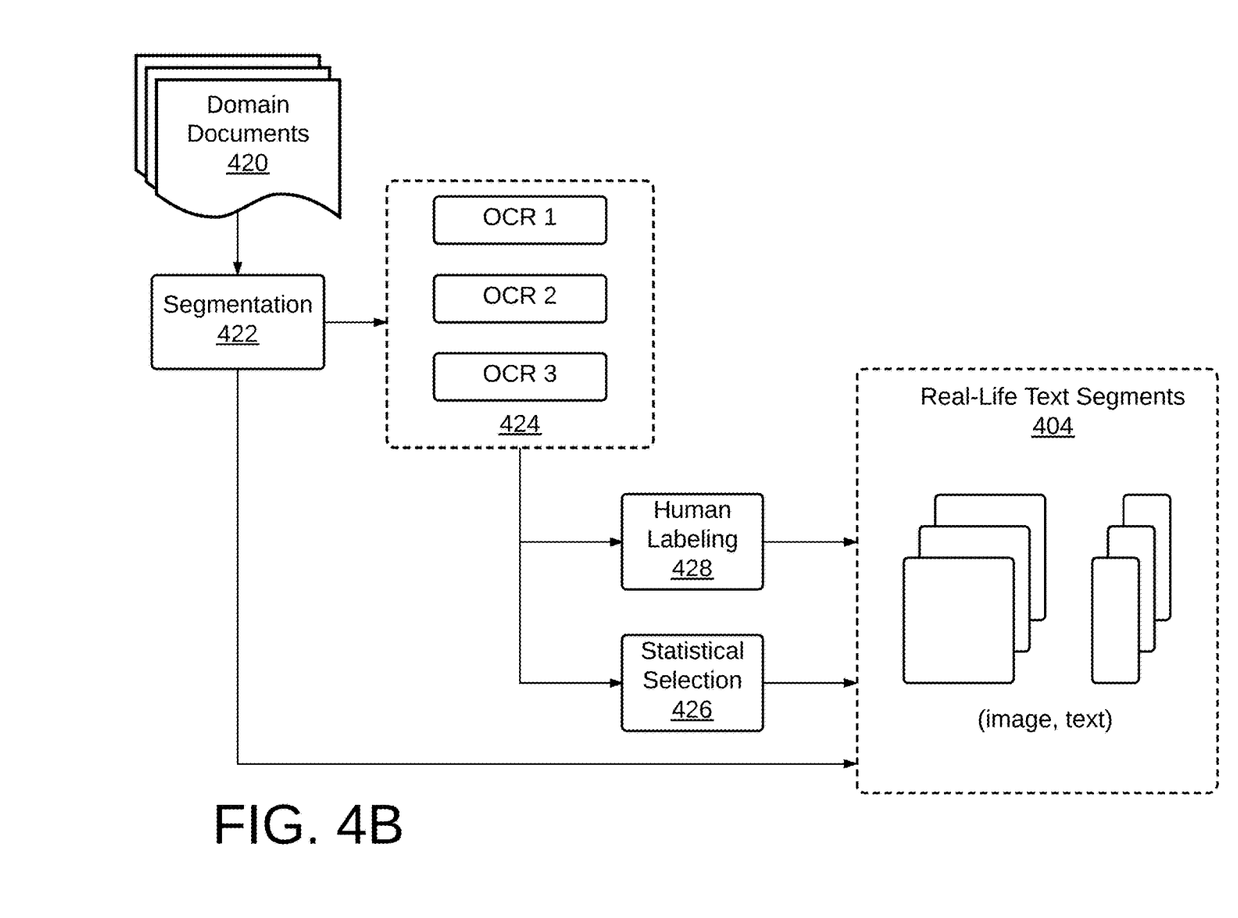
FIG. 4B is a block diagram illustrating generation of real-life text segments.

FIG. 4B is a block diagram illustrating generation of real-life text segments 404. A set of actual documents 420 within a particular domain, in this case, invoices, is accessed, segments are extracted 422, conventional OCR programs 424 that generate relatively low levels of accuracy, as seen in Table 1, are employed to process the segments which may then be labeled 426 and further processed at 428 to generate real-life text segments 402.

Figure 5:
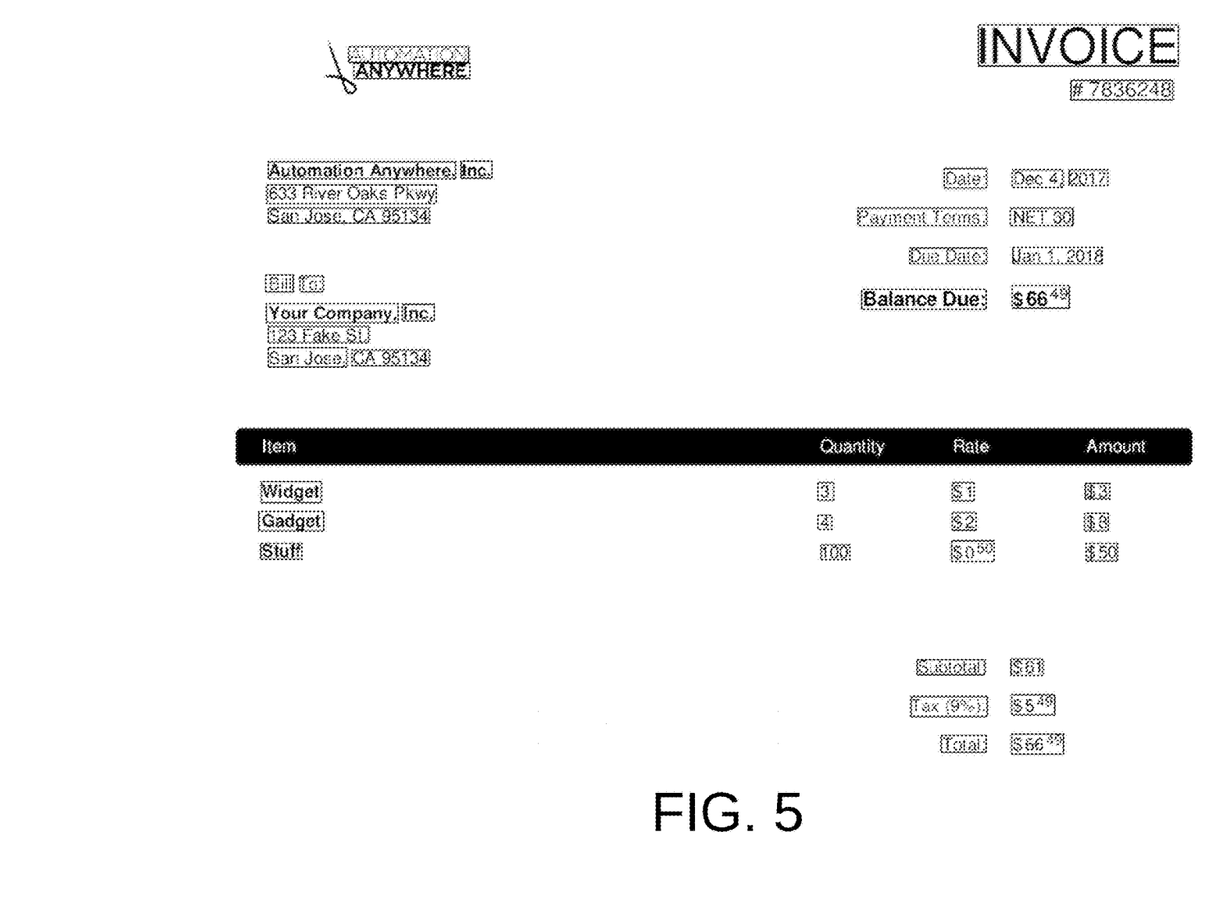
FIG. 5 illustrates the document image of FIG. 2 after segmentation.

Segmentation at 422 is a common step in document digitization. It decomposes a document image into a large number of disjoint sub-images, such as the text delineated by rectangles as shown in FIG. 5, such that each sub-image contains at most a few words worth of text in a single line. Segmentation algorithms usually employ a programmable threshold on size or aspect ratio of the individual sub-images. Common algorithms for this problem are based on connected-components on pixel maps.

The OCR modules 424 may take the form of conventional OCR programs. Typically, such programs provide accuracy that is substantially below a level of accuracy desired for use in business applications, such as invoice processing where accuracy of the data extracted from an invoice is important. The OCR programs 424 advantageously generate large amounts of training data for the deep-learning model. Typically, the OCR programs 424 not only extract text from segment images, but also provide a confidence metric, either per character or per word or per segment. For probabilistic methods such as OCR programs based on neural nets the confidence metric represents the probability of correctness of its output results. This information is used by statistical selection module 426.

The "text" output from weak OCR programs 424 typically contains errors. For example, as seen in Table 1, the conventional OCR programs OCR 1-4 provide segment level accuracy ranging from 0.66 to 0.45. Statistical selection module 426 uses statistical metrics to select the highest quality (image, text) tuples generated by OCR modules 424 to generate the training data 104. Preferably the module 426 employs the following principles: (i) a confidence metric from a deep learning OCR program is more trustworthy than its traditional OCR program counterparts, (ii) segments are chosen in the order of OCR confidence e.g., prefer to choose a segment with higher confidence rather than lower confidence, (iii) selection of segments for which 'text' output has consensus among OCR programs is preferred over ones that do not have consensus, (iv) where there is no consensus, the order of selection is based on "edit distance" between 'text' outputs from different OCR programs e.g., prefer to choose a segment for which two OCR programs have text outputs with 1 character difference rather than segment for which two OCR programs have text outputs with 2 characters different, (v) a disjoint subset of segments is withheld for human labeling at 428, spanning all values of confidence metric, different consensus levels, etc., with the remaining segments serve as starting point for statistical selection. In the foregoing criteria, the "edit distance" refers to the number of changes required to change an incorrect string into a correct string. For example, the incorrect string "invoice" has an edit distance of 1 from the correct string "invoice". When generating the disjoint subset of segments to withhold for human labeling, the goal is to select segments that are relatively more difficult to process (e.g., segments for which OCR confidence was low) to provide the greatest diversity of data for training.

A small fraction of the segments extracted from the documents is sent through human labeling 428. This is the process of human workers providing the correct "text" annotation for a given "image". Preferably, a human worker is provided both the "image" and the best guess on the "text" which is produced by the strongest of the weak OCR programs. The human worker is therefore required to only make corrections to the "text" (produced by the strongest of the weak OCR programs), rather than typing every character. This helps in simplifying the human labeling task. It enhances productivity, makes the process less prone to human error, and thereby helps in saving cost of human labeling. The real-life text segments 404 consist of real-life image/text tuples which are each a pair of an image segment (as received from segmentation module 422) and its corresponding translated textually encoded representation.

Figure 4C:
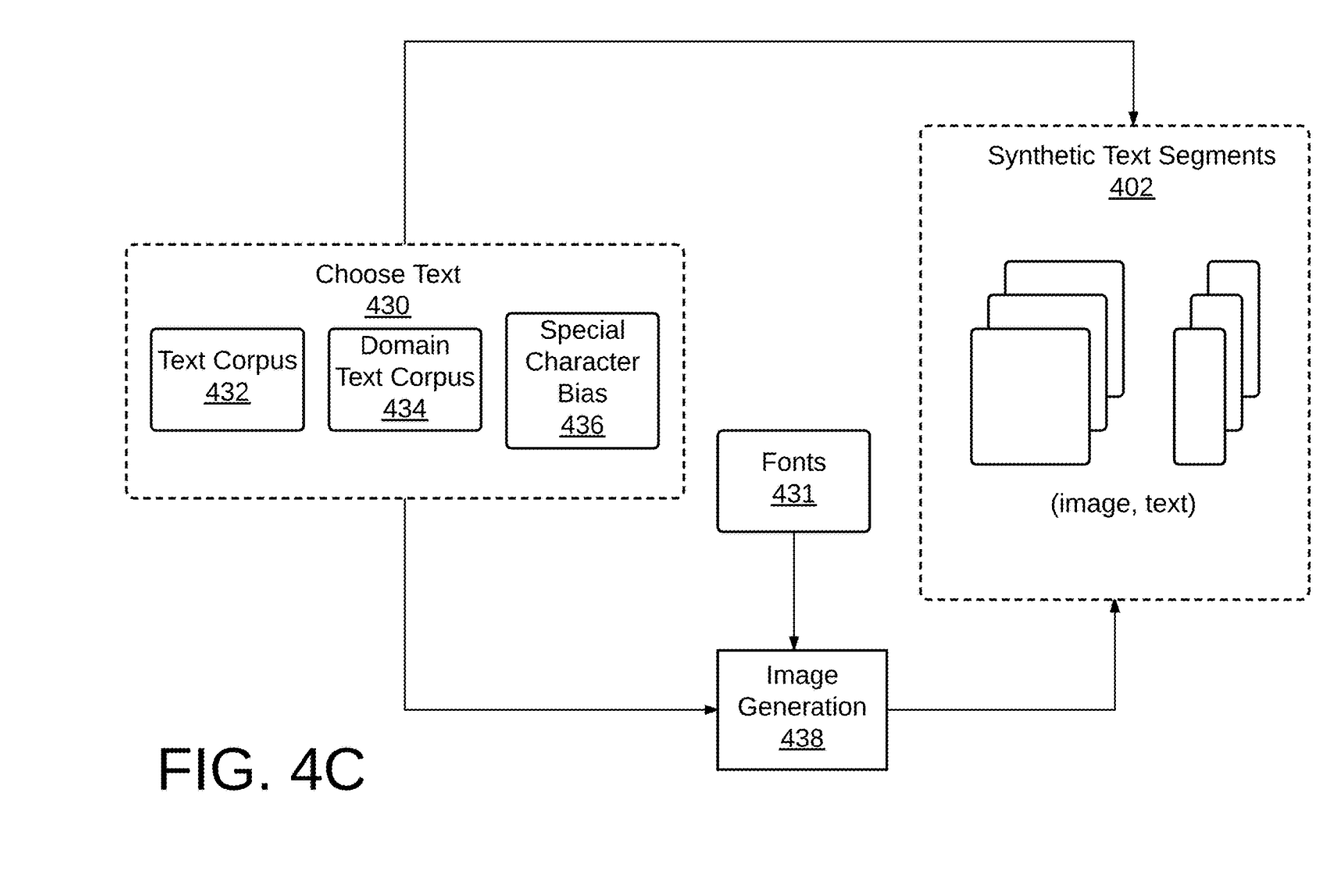
FIG. 4C is a block diagram illustrating generation of synthetic text segments.

FIG. 4C is a block diagram illustrating generation of synthetic text segments 402. Unlike real-life text segments here we choose an appropriate "text" first using statistics of the domain (in Text Corpus 432, Domain Text Corpus 434, and Special Character Bias 436) we are developing the OCR program for, followed by rendering the "text" into an "image" (in 438) using a random font and font-size from 431. This advantageously creates more training data for the deep learning system 103 in a cost-effective and rapid manner. The statistics represented in chosen "text" match characteristics of the domain of interest, such as language, special characters, and particular word segments. Furthermore, the image representation of synthetically generated text segments 402 contain the type of variety that may be encountered among different documents within the domain of interest so the images are more realistic. Using 432/434/436 we generate "text". We use this "text" and a randomly chosen font 431 to pass through image generation 438 and generate the "image".

For example, a variety of fonts may be employed. An existing repository such as the Google open-source repository for fonts available at https://github.com/google/roboto, that contains 2000+ fonts in up to 18 different styles each may be employed. Care must be taken (a) to filter out fonts & font-size combinations that render poor images, (b) to drop font families irrelevant to the domain e.g., exclude Greek characters when training a model for English language, (c) to properly handle unicase fonts e.g., in which "a" and "A" are represented by same shape Text corpus 432, in one embodiment, comprises several tens of thousands of fully-formed English sentences, composed of 2.4 million English words. This is advantageously large enough to capture the statistics of commonly used words and/or word combinations. In one embodiment, the 2.4 million English words is arranged in an ordered list so that word combinations and orderings are preserved. A sequence of text words for training data is first formed by choosing consecutive words from the ordered list, and anchored at a random list-index. The segment length chosen randomly as a number between 1 through 8. Once the sequence of text words is determined it is then rendered into an image using a randomly chosen font and font size. This allows creation of (image, text) pairs randomly for training data.

Domain text corpus 434 provides statistics of common text elements in the domain of interest, here English language invoices, for example, frequent occurrence of numbers, dates, and addresses. In order to create Domain text corpus 434 we employ a conventional OCR program to extract text words from several thousand document examples. Even though the conventional OCR programs may have text extraction errors, they work sufficiently well for creating (image, text) tuples for training data. Note that unlike real-life text segments the OCR extraction errors pose less problems. In case of real-life segment the text extraction errors result in (image, text) tuples becoming inconsistent, while in case of synthetic segments the (image, text) tuples remain consistent, although not ideal for the purpose of training data. The Domain text corpus 434 is used just like Text corpus 432. First a sequence of words is randomly chosen to form "text" (using the method described for Text corpus 432) and then the corresponding "image" is rendered at 431 using a randomly chosen font and font size. Special character bias 436 operates to address the fact that English language invoices contain a larger proportion of text in capital letters. Furthermore, it operates to artificially inject a large proportion of special characters (".", ";", "/", "-", etc), that occur frequently in invoices. In one embodiment, such biases are injected into the randomly chosen sequence of words (either for Text corpus 432 or for Domain text corpus 434) and before the image is rendered.

Image generation module 438 operates to generate an image representation. The original text segments 429 are paired with the image representations generated at 438 to form synthetic (image,text) tuples 402, which each comprise a pair of an image segment together with its corresponding textually encoded representation.

Figure 6:
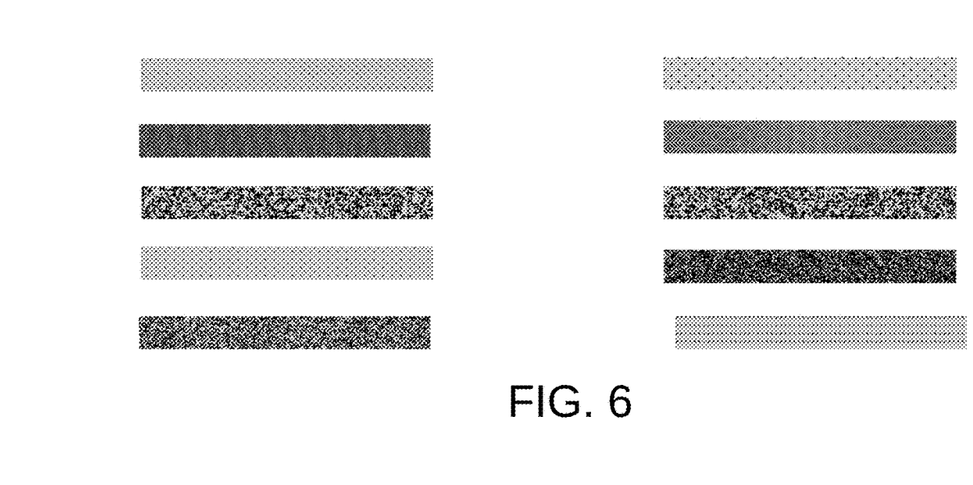
FIG. 6 shows examples of patterned noise found in invoices.

FIG. 6 shows examples of patterned noise that may be introduced by module 408. The ten examples shown in FIG. 6 are 512×64 pixel patterned noise templates that have been generated programmatically to represent patterns commonly found in English language invoices.

Figure 7:
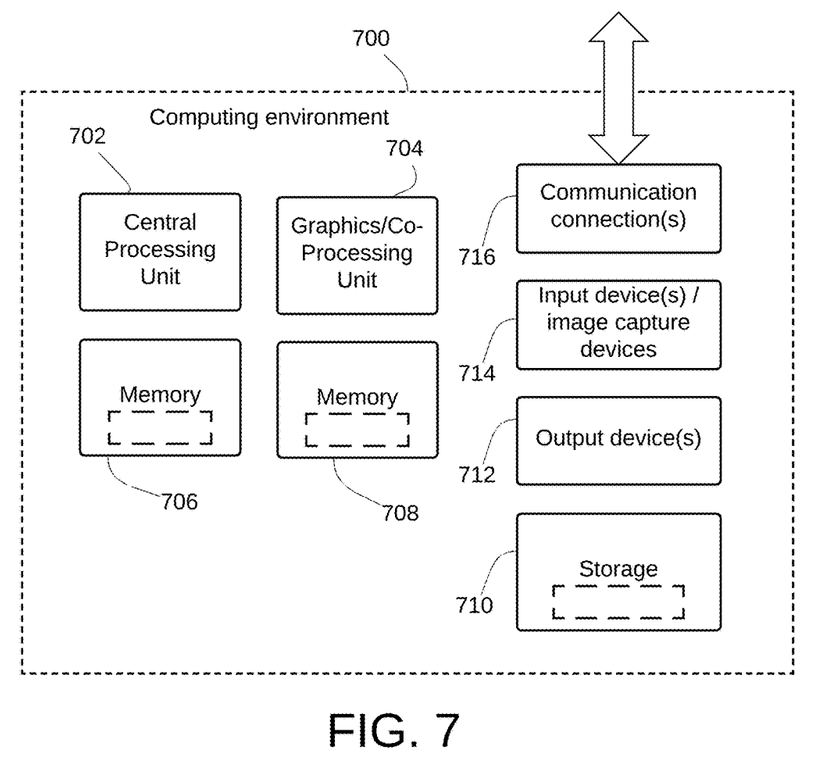
FIG. 7 illustrates a block diagram of hardware that may be employed in an implementation of the system 10.

FIG. 7 depicts a generalized example of a suitable general-purpose computing system 700 in which the described innovations may be implemented in order to improve the processing speed and efficiency with which the computing system 700 operates to perform the functions disclosed herein. With reference to FIG. 7, the computing system 700 includes one or more processing units 702, 704 and memory 706, 708. The processing units 702, 706 execute computer-executable instructions. A processing unit can be a general-purpose central processing unit (CPU), processor in an application-specific integrated circuit (ASIC) or any other type of processor. The tangible memory 706, 708 may be volatile memory (e.g., registers, cache, RAM), non-volatile memory (e.g., ROM, EEPROM, flash memory, etc.), or some combination of the two, accessible by the processing unit(s). The hardware components in FIG. 7 may be standard hardware components, or alternatively, some embodiments may employ specialized hardware components to further increase the operating efficiency and speed with which the system 100 operates.

Computing system 700 may have additional features such as for example, storage 710, one or more input devices 714, one or more output devices 712, and one or more communication connections 716. An interconnection mechanism (not shown) such as a bus, controller, or network interconnects the components of the computing system 700. Typically, operating system software (not shown) provides an operating system for other software executing in the computing system 700, and coordinates activities of the components of the computing system 700.

The tangible storage 710 may be removable or non-removable, and includes magnetic disks, magnetic tapes or cassettes, CD-ROMs, DVDs, or any other medium which can be used to store information in a non-transitory way and which can be accessed within the computing system 700. The storage 710 stores instructions for the software implementing one or more innovations described herein.

The input device(s) 714 may be a touch input device such as a keyboard, mouse, pen, or trackball, a voice input device, a scanning device, or another device that provides input to the computing system 700. For video encoding, the input device(s) 714 may be a camera, video card, TV tuner card, or similar device that accepts video input in analog or digital form, or a CD-ROM or CD-RW that reads video samples into the computing system 700. The output device(s) 712 may be a display, printer, speaker, CD-writer, or another device that provides output from the computing system 700.

The communication connection(s) 716 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "computing device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A computer-implemented method for training a computerized deep learning system utilized by an optical character recognition system comprising the computer-implemented operations of:

generating a plurality of synthetic text segments, by programmatically converting each of a plurality of text strings to a corresponding image, each text string and corresponding image forming a synthetic image/text tuple;

generating a plurality of real-life text segments by processing from a corpus of document images, at least a subset of images from the corpus, with a plurality of OCR programs, each of the OCR programs processing each image from the subset to produce a real-life image/text tuple, and at least some of the OCR programs producing a confidence value corresponding to each real-life image/text tuple, and wherein each OCR program is characterized by a conversion accuracy substantially below a desired accuracy for an identified domain;

storing the synthetic image/text tuple and the real-life image/text tuple to data storage as training data in a format accessible by the computerized deep learning system for training; and training the computerized deep learning system with the training data.

2. The computer-implemented method of claim 1 further comprising:
augmenting the synthetic image/text tuples and the real-life image/text tuples data by adding noise to image portions of the tuples.

3. The computer-implemented method of claim 2 wherein adding noise to image portions of the tuples comprises:
randomly selecting image portions of the tuples and superimposing to the selected image portions, noise selected from the group consisting of random speckled noise, random lines, random binarization threshold, white on black text.

4. The computer-implemented method of claim 2 wherein adding noise to image portions of the tuples comprises:
randomly selecting image portions of the tuples and superimposing patterned noise to the selected image portions.

5. The computer-implemented method of claim 1 further comprising processing the image portions of the tuples to format the image portions into a fixed normative input employed by the computerized deep learning system.

6. The computer-implemented method of claim 5 wherein processing the image portions of the tuples to format the image portions into a fixed normative input employed by the computerized deep learning system comprises:
scaling the image portion of each of the tuples to fit in a field of view of the computerized deep learning system.

7. The computer-implemented method of claim 5 wherein processing the image portions of the tuples to format the image portions into a fixed normative input employed by the computerized deep learning system comprises:
centering the image portion of each of the tuples within a field of view of the computerized deep learning system.

8. The computer-implemented method of claim 1 further comprising:
processing, for storage as training data, output of the OCR programs by employing statistical metrics to identify the highest quality tuples generated by the OCR programs.

9. The computer-implemented method of claim 8 wherein employing the statistical metrics comprises:
selecting, between confidence metrics of equal value generated by two or more OCR programs, a confidence metric generated from a deep-learning based OCR program over confidence metrics generated from OCR programs not based on computerized deep learning;
selecting segments in order of OCR confidence as indicated by confidence metric generated by an OCR program; and
selecting segments for which the same text is generated by the OCR programs, and if the same text is not generated by the OCR programs then selecting segments having the least edit distance.

10. The computer-implemented method of claim 9 further comprising:
identifying a subset of the real-life image/text tuples for labeling by humans, the subset characterized by a range of confidence values and differing outputs among the OCR programs for given segments.

11. The computer-implemented method of claim 1 further comprising modifying a font of the image portion of at least a subset of the synthetic image/text tuples.

12. The computer-implemented method of claim 1 wherein generating a plurality of synthetic text segments comprises randomly selecting sets of consecutive words from a text corpus comprising a set of fully-formed English language sentences.

13. The computer-implemented method of claim 1 wherein generating a plurality of synthetic text segments comprises randomly selecting sets of consecutive words from a text corpus characterized by common text elements in the identified domain.

14. The computer-implemented method of claim 12 further comprising modifying the selected sets of consecutive words to reflect biases of character types that occur in the identified domain.

15. The computer-implemented method of claim 13 further comprising modifying the selected sets of consecutive words to reflect biases of character types that occur in the identified domain.

16. The computer-implemented method of claim 14 further comprising generating the image portion of the synthetic image/text tuple in accordance with a randomly chosen font and font size.

17. The computer-implemented method of claim 15 further comprising generating the image portion of the synthetic image/text tuple in accordance with a randomly chosen font and font size.

18. A computerized optical character recognition system comprising:
a computerized deep learning system trained to process a plurality of encoded images within a particular domain to identify images representing text within each encoded image and converting the encoded images representing text to textually encoded data;
data storage for storing the encoded images representing text and textually encoded data;
wherein the computerized deep learning system is trained with training data generated from a corpus of,
real-life text segments generated by processing from a corpus of encoded document images, at least a subset of encoded images from the corpus, with a plurality of OCR modules, each of the OCR modules processing each encoded image from the corpus to produce a real-life image/text tuple, and at least some of the OCR modules producing a confidence value corresponding to each real-life image/text tuple, and wherein each OCR module is characterized by an conversion accuracy substantially below a desired accuracy for an identified domain; and
synthetically generated text segments, generated by programmatically converting each of a plurality of text strings to a corresponding encoded image, each text string and corresponding encoded image forming a synthetic image/text tuple.

19. The computerized optical character recognition system of claim 18 wherein the real-life image/text tuples are processed to fit within a field of view of the computerized deep learning system, and wherein the synthetic image/text tuples are processed to reflect textual characteristics of the identified domain.

20. A computerized system for training a computerized deep learning system utilized by an optical character recognition system comprising:
a processor configured to execute instructions that when executed cause the processor to:
generate a plurality of synthetic text segments, by programmatically converting each of a plurality of text strings to a corresponding image, each text string and corresponding image forming a synthetic image/text tuple; and
generate a plurality of real-life text segments by processing from a corpus of document images, at least a subset of images from the corpus, with a plurality of OCR modules, each of the OCR modules processing each image from the subset to produce a real-life image/text tuple, and at least some of the OCR modules producing a confidence value corresponding to each real-life image/text tuple, and wherein each OCR module is characterized by an conversion accuracy substantially below a desired accuracy for an identified domain; and data storage, operatively coupled to the processor, for storing the synthetic image/text tuple and the real-life image/text tuple as training data in a format accessible by the deep learning system for training, wherein the computerized system employs the training data to train the deep learning system.

21. The computerized system of claim 20 wherein the processor is further configured to execute instructions that when executed cause the processor to:

augment the synthetic image/text tuples and the real-life image/text tuples data by adding noise to image portions of the tuples.

22. The computerized system of claim 21 wherein adding noise to image portions of the tuples comprises:

randomly selecting image portions of the tuples and superimposing to the selected image portions, noise selected from the group consisting of random speckled noise, random lines, random binarization threshold, white on black text.

23. The computerized system of claim 21 wherein adding noise to image portions of the tuples comprises:

randomly selecting image portions of the tuples and superimposing patterned noise to the selected image portions.

24. The computerized system of claim 20 wherein the processor is further configured to execute instructions that when executed cause the processor to:

process the image portions of the tuples to format the image portions into a fixed normative input employed by the computerized deep learning system.

25. The computerized system of claim 24 wherein the instructions that when executed cause the processor to process the image portions of the tuples to format the image portions into a fixed normative input employed by the deep learning system comprise instructions that when executed cause the processor to:

scale the image portion of each of the tuples to fit in a field of view of the deep learning system.

26. The computerized system of claim 24 wherein the instructions that when executed cause the processor to process the image portions of the tuples to format the image portions into a fixed normative input employed by the computerized deep learning system comprise instructions that when executed cause the processor to:

center the image portion of each of the tuples within a field of view of the computerized deep learning system.

27. The computerized system of claim 20 wherein the processor is further configured to execute instructions that when executed cause the processor to:

process, for storage as training data, output of the OCR programs by employing statistical metrics to identify the highest quality tuples generated by the OCR programs.

28. The computerized system of claim 27 wherein employing the statistical metrics comprises:

selecting, between confidence metrics of equal value generated by two or more OCR programs, a confidence metric generated from a deep-learning based OCR program over confidence metrics generated from OCR programs not based on deep learning;

selecting segments in order of OCR confidence as indicated by confidence metric generated by an OCR program; and selecting segments for which the same text is generated by the OCR programs, and if the same text is not generated by the OCR programs then selecting segments having the least edit distance.

29. The computerized system of claim 28 wherein the processor is further configured to execute instructions that when executed cause the processor to:

identify a subset of the real-life image/text tuples for labeling by humans, the subset characterized by a range of confidence values and differing outputs among the OCR programs for given segments.

30. The computerized system of claim 20 wherein the processor is further configured to execute instructions that when executed cause the processor to:

modify a font of the image portion of at least a subset of the synthetic image/text tuples.

31. The computerized system of claim 20 wherein the instructions that cause the processor to generate a plurality of synthetic text segments comprise instructions that when executed cause the processor to:

randomly select sets of consecutive words from a text corpus comprising a set of fully-formed English language sentences.

32. The computerized system of claim 20 wherein the instructions that cause the processor to generate a plurality of synthetic text segments comprises instructions that when executed cause the processor to:

randomly select sets of consecutive words from a text corpus characterized by common text elements in the identified domain.

33. The computerized system of claim 31 further comprising instructions that when executed cause the processor to:

modify the selected sets of consecutive words to reflect biases of character types that occur in the identified domain.

34. The computerized system of claim 32 further comprising instructions that when executed cause the processor to:

modify the selected sets of consecutive words to reflect biases of character types that occur in the identified domain.

35. The computerized system of claim 33 further comprising instructions that when executed cause the processor to:

generate the image portion of the synthetic image/text tuple in accordance with a randomly chosen font and font size.

36. The computerized system of claim 34 further comprising instructions that when executed cause the processor to:

generate the image portion of the synthetic image/text tuple in accordance with a randomly chosen font and font size.

* * * * *